Nov. 5, 1935.  B. JONES  2,019,708
COURSE CALCULATING INSTRUMENT
Filed June 2, 1933  2 Sheets-Sheet 1
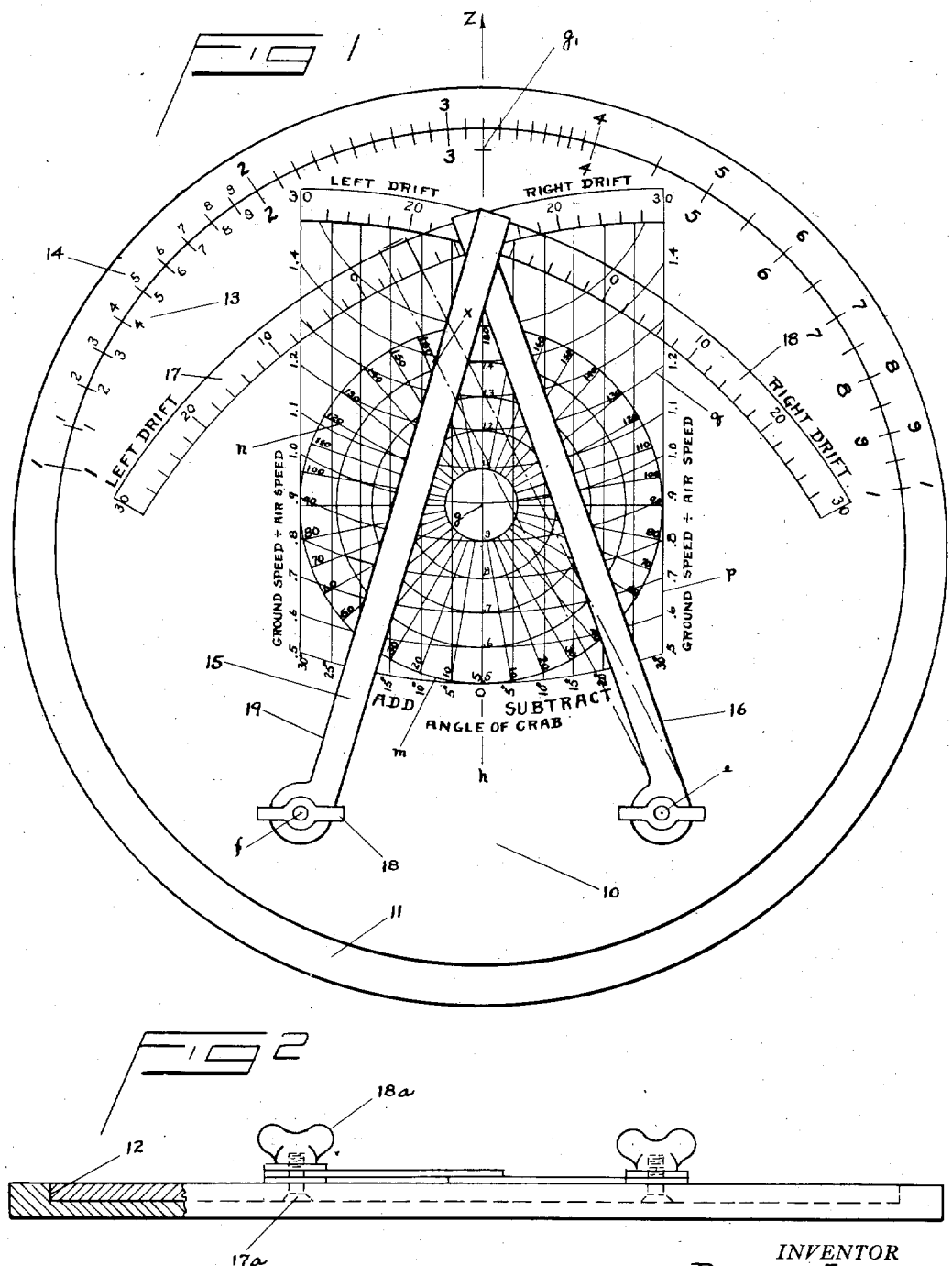
INVENTOR
BRADLEY JONES
BY
ATTORNEYS Nov. 5, 1935.  B. JONES  2,019,708
COURSE CALCULATING INSTRUMENT
Filed June 2, 1933  2 Sheets-Sheet 2
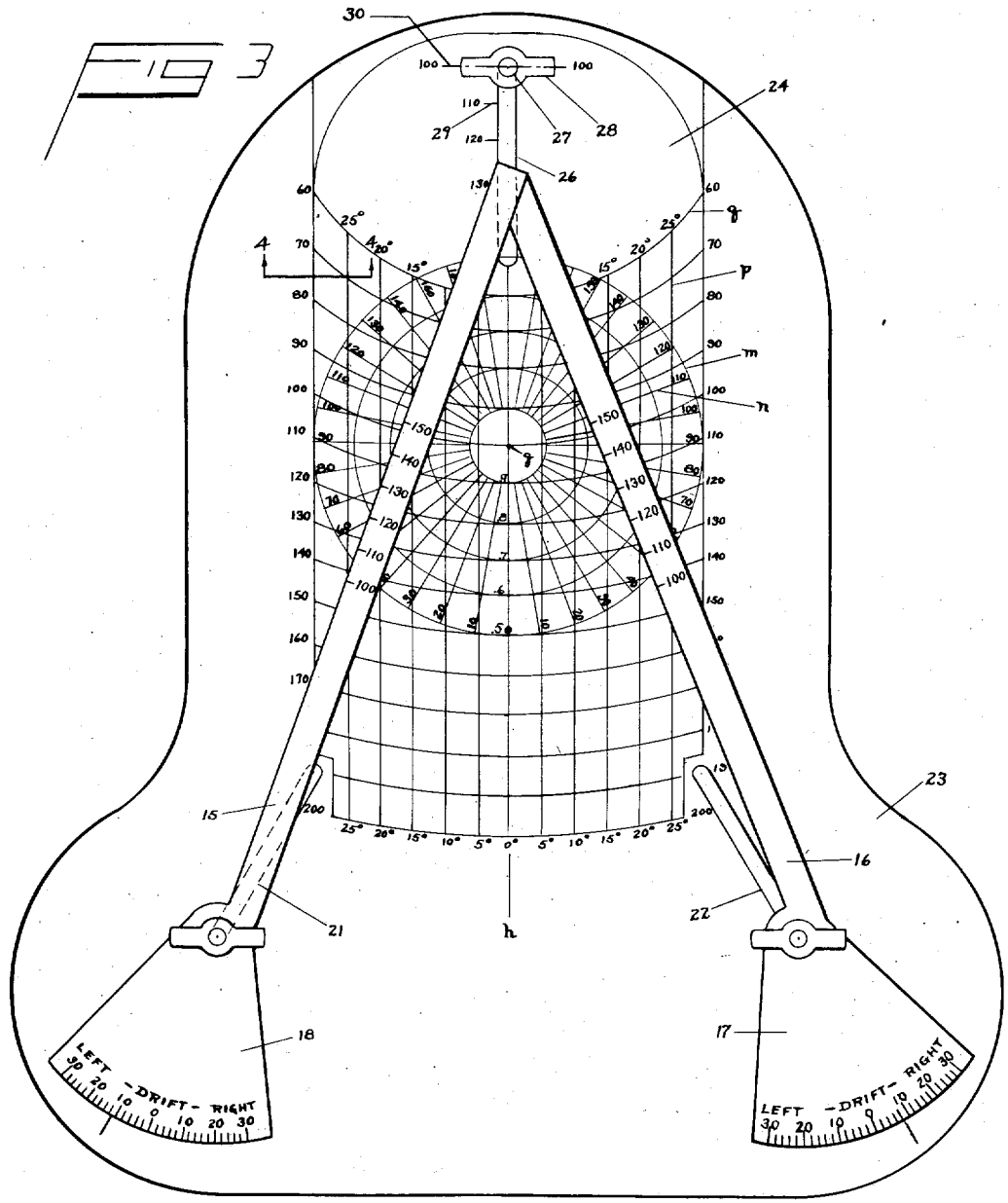
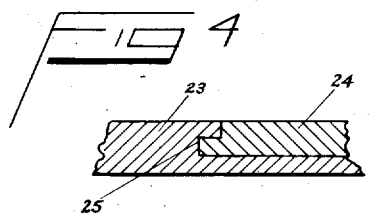
INVENTOR
BRADLEY JONES
BY
ATTORNEYS Patented Nov. 5, 1935

2,019,708

UNITED STATES PATENT OFFICE 2,019,708

COURSE CALCULATING INSTRUMENT

Bradley Jones, Cincinnati, Ohio

Application June 2, 1933, Serial No. 674,060

16 Claims. (Cl. 33—76)

The present invention relates to improvements in navigating instruments, and one object is to provide a new and improved navigation instrument, more especially designed for use on airplanes, to enable an aviator to quickly determine the position of the airplane while in flight and with but little mental effort, by eliminating the necessity for the mental solution of mathematical equations. To be more specific, the principal object of the present invention is to provide an instrument by which the course and dead reckoning calculations may be readily and accurately made, which may be utilized to ascertain the correct heading in which an aviator must fly in order to proceed in a straight line directly to his destination, having due regard for the direction and velocity of the wind.

A further object of the present invention is to provide an instrument, which will not only indicate the direction in which the airplane must be headed in order to fly directly to a predetermined destination, but which will also indicate the correct ground speed for that heading. In other words, the present invention contemplates providing an instrument which will readily determine the the angle of crab, for any existing wind velocity and direction of the wind, so that the airplane will be maintained on its course. The angle of crab, above referred to, is that angle between the longitudinal axis of the airplane and the line of dead reckoning or ground course of the airplane.

A further object of the present invention is to provide a navigation instrument in which wind velocity and direction of the wind may be readily determined while in the air.

A still further object of the present invention is to provide a navigating instrument in which a course may be plotted quickly and simply, and which will obviate the necessity of making mental mathematical calculations as to the direction in which an airplane should be headed in order to fly a straight course to its destination.

It is also an object of the present invention to provide an instrument which will be simple and practical in construction, durable and efficient in use, and unlikely to get out of order and comparatively inexpensive to manufacture.

In order to produce the desired results, use is made of three elements, namely, a chart having a series of scales and two indicating members cooperating with said scales, one of the said elements being fixed and the other two elements having movement relative to the fixed element and having movement independently of one another, one of said scales representing velocity of the wind, another representing the direction of the wind with respect to the airplane, another representing the angle of crab or crab correction, and another representing the ground speed of the airplane at the time of crab correction.

With these and other objects in view, the invention consists in certain novel features of construction and combination and arrangement of parts as will be more fully hereinafter described and pointed out in the appended claims.

In the accompanying drawings:

Fig. 1 is a plan view of my improved navigating instrument showing the parts in position to calculate wind speed and velocity.

Fig. 2 is an end view of Fig. 1.

Fig. 3 is a top plan view of a modification of the invention shown in Fig. 1.

Fig. 4 is a sectional view taken on the line 4—4 of Fig. 3.

Referring more particularly to the drawings wherein corresponding parts are designated by like numerals throughout the several views thereof, the instrument in one embodiment of my invention herein illustrated comprises, as shown in Fig. 1, a circular disc 10 having various curves and lines described upon it which will be hereinafter described. For convenience, the circular disc 10 is mounted in an outer circular disc 11 which is provided with an annular flange 12 within which the disc 10 is adapted to snugly fit. The periphery of the circular disc 10 is provided with a logarithmic scale 13 which corresponds with a similar logarithmic scale 14 provided on the peripheral edge of the flange 12, thus forming a circular slide rule. The present form of calculator gives ground speed and wind speed as fractions of the airspeed and the circular slide rule is only intended to facilitate the calculation of ground speed and wind speed, but it is to be understood that the circular slide rule is not an essential part of the invention but is included merely for the sake of convenience.

The arrangement of the scales on the disc 10 may be described as follows:

The circular disc 10 has described thereon a reference point $g$ which, as shown in Fig. 1, need not necessarily be positioned in the center of the disc. A vertically extending line $gh$ passes through the point $g$, as shown in Fig. 1. It should be noted that the various scales on the disc 10 are symmetrical about the line $gh$. Points $e$ and $f$ are pivots for the arms 15 and 16. As shown in Fig. 1, the arms 15 and 16 are pivotally mounted with their axes coincident with points $e$ and $f$, to the circular disc 10 through the medium of the machine screws 17a and the adjustable thumb nuts 18a. The points e and f are at a distance unity from point g, and the angles fgh and egh are thirty degree angles. With g as a center there is a system of concentric circles m scribed on the disc 10 whose radii are fractional parts of unity and are so appropriately marked. These circles represent wind speed in fractions of air speed. It will also be noted that with point g as a center, there is a system of radiating lines n marked with angular distances from points gh. These radiating lines represent the direction of the wind with respect to the airplane. With the line gh as a center, there is a system of equally spaced lines p parallel to the line gh, each line being marked with an angle and the distance from gh for those lines being the natural sine of that angle as a fraction of the unity already chosen. The parallel lines p represent the angle of crab or correction necessary to maintain an aircraft on its course having due regard for the velocity and direction of the wind. The point g', as shown in Fig. 1, is on the line hg prolonged, and at a distance unity from the point g. With the point g' as a center there is scribed on the disc 10 a system of arcs of concentric circles q whose radii are fractional parts of unity. It should be noted that the circle through point g is marked unity, the circles with radii less than unity are marked unity plus this decrement while the circles greater than unity are designated unity minus this increment. The system of arcs q represent actual ground speed of the airplane when "crabbed" into the wind.

The drift arms 15 and 16 heretofore mentioned are provided with scales 17 and 18 to show their angular setting to left or right of the line eg and fg respectively.

As hereinabove stated, the instrument of my invention is adapted for use in air navigation, whereby if the air speed and the drift on two courses are known, there may be ascertained the velocity of the wind, the direction of the wind with respect to the aircraft heading, the amount of crab or correction to be applied to compensate for drift, and the actual ground speed. In the following description of the operation of this instrument, it is assumed that with the aircraft headed in the direction it is desired to proceed, that the aircraft is momentarily headed thirty degrees to one side of the original heading and the drift measured and that the aircraft is thereafter momentarily headed thirty degrees to the other side of the desired heading and the drift measured. The thirty degree change is, of course, not essential and any other angular change of course may be chosen and the position of the drift arms pivot on the calculator changed accordingly.

The use of the instrument is best illustrated by an example. Suppose that it is desired that the aircraft fly on the course Z. Should this be the case, the airplane is momentarily flown on course Z plus thirty degrees long enough to measure drift, and let it be supposed that this drift is found to be fourteen degrees left. Thereafter, the heading is altered sixty degrees to Z minus thirty degrees and the drift measured on this heading. Let it be supposed that this drift is found to be four degrees right. Having found the drift of the two courses above described, the drift arm 15 is set on fourteen degrees left drift on the scale 18 and the drift arm 16 is set on four degrees right drift on the scale 17, the latter being shown in dotted line position in Fig. 1. Having accomplished the setting of the drift arms in the manner above suggested, the intersection of the fiducial edge 19 on the drift arm 15 and the fiducial edge 20 on the drift arm 16 as indicated at X gives the following information:

The direction of the wind is the direction of gx or 162 degrees to the right of the airplane's desired heading or Z plus 162 degrees, and is read by means of the radiating lines n or by interpolation between them. The strength or velocity of the wind is equivalent to the length of gx or .42 of the airspeed and is read by means of the concentric circles m or interpolations between them. The operation of finding .42 of the airspeed if not performed mentally may be calculated by use of the circular slide rule hereinabove mentioned.

The amount of crab or correction to the heading of the aircraft will be found to be eight degrees to the right, so that heading of the aircraft should be zero plus eight degrees in order that the aircraft should be maintained on course Z. This angle of crab as it is more generally referred to is read by means of the lines p or interpolation between them.

The ground speed when the aircraft is headed in the direction Z plus eight degrees, and traveling in the direction Z, is 1.39 times the air speed and may be determined through the medium of the circles q' or by interpolation between them. The operation of finding 1.39 times the airspeed may, if desired, be performed on the circular slide rule hereinabove mentioned.

A modification of the instrument is shown in Fig. 3. In this form of the invention the pivots for the drift arms 15 and 16 are longitudinally movable in the slots 21 and 22 provided in the base 23 of the instrument. As shown in Fig. 3, the slots 21 and 22 are disposed at angles of thirty degrees respectively to the line gh. Consequently, the pivots of the drift arms 15 and 16 are permitted to be moved in or out along the line through g and at thirty degrees to the line gh. In this modification of the invention the scales 17 and 18 heretofore mentioned are shown as being incorporated as an extension of the drift arms 15 and 16 which cooperate with suitable indices scribed on the base 23 as shown on this figure.

In this modification of the invention, the wind speed circles m and the wind direction radial lines n are scribed on the base 23 of the instrument. In this instance, however, the wind speed circles m are marked in miles per hour instead of in fractions of unity as in the embodiment of the instrument shown in Fig. 1.

Also, as shown in Fig. 3, the ground speed circles q are scribed on a plate 24 of transparent material. This plate is slidable over the base 23 of the instrument and is restricted by grooves 25 or other suitable means so that it may move only in the direction gh or the reverse. At its one end the plate 24 is provided with a longitudinally extending slot 26 through which is adapted to pass a bolt 27 having a hand nut 28 so that the plate 24 may be clamped in any setting by means of the clamping nuts. It should also be noted that the slot 26 is provided with a scale 29 calibrated on its one side in terms of air speed adapted for registry with an index 30 marked on the base 23. In the modification shown in Fig. 3, the ground speed circles q are marked in miles per hour instead of fractions of air speed in the manner set forth in connection with Fig. 1. In operating this modification of the invention, the plate 24 is set for air speed by moving the same longitudinally in its groove 25 until either the circle marked with the airspeed passes through the point $g$, or by means of the auxiliary scale 29 provided in connection with the slot 26. For the purposes of this modification the "crab" line $p$ may be marked either on the base 23 or upon the transparent plate 24. In using this modification of the instrument, the same procedure is followed as that used in connection with Fig. 1 of the drawings, except that the wind speed and ground speed may be read directly. Also in operating this modification of the instrument, the pivots $e$ and $f$ are set at a distance from point $g$ equivalent to the air speed. To this end the drift arms 15 and 16 are provided with a scale of miles per hour. Setting of the pivots $e$ and $f$ may be accomplished by swinging the drift arms inwardly until they touch the point $g$ and thereafter moving the pivots $e$ and $f$ in the slots 21 and 22 until the proper marking of the scales of $g$ correspond with the air speed of the airplane. For convenience, the wind speed circles $m$, the wind direction radial lines $n$, the ground speed circles $q$ and the crab lines $p$ may be painted in various colors so that the scales may be readily and instantaneously distinguished one from the other.

When an airplane which carries my improved instrument is in the air, it will, of course, be necessary to take readings at intervals, since weather conditions will not remain exactly the same and the direction and the velocity of the wind may vary.

It is to be understood that the accompanying drawings are merely illustrative of the preferred embodiment of my invention, and that various slight changes and alterations may be made in the general form and arrangement of the parts described without departing from the invention and since I do not wish to limit myself to the precise details set forth, but desire to avail myself of such slight changes and alterations as clearly fall within the spirit and scope of the appended claims.

Having thus described my invention, what I claim as new and desire to secure by Letters Patent is:—

1. A navigation instrument for determining velocity triangles comprising, a base plate provided with a series of scales having an axis of symmetry common to all, said scales representing in magnitudes and directions, wind speeds, and ground speeds, and a pair of relatively movable indicating arms pivotally mounted on said base plate, the pivoting axes of which are symmetrically disposed on opposite sides of the axis of symmetry of said scales, said arms being adapted for movement over said scales in predetermined angular degrees of overlapping relation, the point of intersection of the fiducial edges of which mechanically determines vector magnitudes and directions of said velocity triangles.

2. A navigation instrument for determining velocity triangles comprising a base plate provided with a series of scales having an axis of symmetry common to all, said scales representing wind speeds and ground speeds, a pair of relatively movable drift arms pivotally mounted on said base plate, the pivoting axes of said drift arms being symmetrically disposed on opposite sides of the axis of symmetry of said scales, a drift scale for each of said arms, said drift arms being adapted for movement over said scales in predetermined degrees of overlapping relation, in accordance with the measured drift over two courses, the point of intersection of the fiducial edges of which mechanically determines vector magnitudes and directions of said velocity triangles.

3. A navigation instrument for determining velocity triangles, comprising a base plate having a plurality of symmetrically related scales thereon, a plate of transparent material having a scale thereon in symmetrical relation with said first mentioned scales, said plate being movable longitudinally with resepct to the scales on said base plate, and a pair of relatively movable drift arms adjustably pivotally mounted on said base plate and symmetrically arranged relative to the scales on said base plate adapted to coact with one another and with said scales to ascertain in magnitudes and directions the vectors of said velocity trangles mechanically.

4. A navigation instrument for determining velocity triangles comprising, a base plate having a plurality of symmetrically related scales arranged thereon, a plate of transparent material provided with a pair of scales, one at least of said scales being symmetrically disposed relative to the scales on said base plate, the other of said scales being calibrated in terms of air speed, and registering with an index carried on said base plate, said plate being adjustable longitudinally with respect to the scales on said base plate, and a pair of relatively movable drift arms adjustably pivotally mounted on said base plate and symmetrically arranged relative to the scales thereon adapted to coact with one another and with said scales to ascertain in magnitudes and directions the vectors of said velocity triangles mechanically, each of said drift arms being provided with an air speed scale to permit the setting of said arms with respect to said scales for any given air speed.

5. A navigation instrument as set forth in claim 4, each of said drift arms being characterized by including a drift scale adapted for registry with an index carried by said base plate for setting said drift arms thereon in accordance with the measured drift over two courses in computing the corrections to be made in the heading of an aircraft to compensate for drift.

6. A navigation instrument for determining velocity triangles, comprising a base plate having a plurality of symmetrically related scales arranged thereon, an auxiliary plate of transparent material provided with a pair of scales, one of said scales being symmetrically disposed relative to the scale on said base plate and representing ground speed in fractions of air speed, the other of said scales being calibrated in terms of air speed adapted for registry with an index carried on said base plate, said auxiliary plate being adjustable longitudinally with respect to the scales on said base plate, and a pair of relatively movable drift arms adjustably pivotally mounted on said base plate and symmetrically arranged relative to the scales thereon adapted to coact with one another and with said ground speed scale to ascertain in magnitude and direction the ground speed vector of said velocity triangles mechanically for any given air speed.

7. A navigation instrument for determining velocity triangles, comprising a base plate having a plurality of symmetrically related scales arranged thereon, one of said scales representing wind speed as a fractional part of air speed, an auxiliary plate of transparent material provided with a pair of scales, one of said scales being symmetrically disposed relative to the scales on said base plate and representing ground speed in fractions of air speed, the other of said scales being calibrated in terms of air speed adapted for registry with an index carried on said base plate, said auxiliary plate being adjustable longitudinally with respect to the scales on said base plate, and a pair of relatively movable drift arms adjustably pivotally mounted on said base plate and symmetrically arranged relative to the scales thereon adapted to coact with one another and with said ground speed scale and wind speed scale to ascertain the magnitude of the ground speed and wind speed vectors of said velocity triangles, mechanically, for any given air speed.

8. A navigation instrument for determining velocity triangles comprising, a base plate having a plurality of symmetrically related scales arranged thereon, one of said scales representing wind speed as fractions of air speed, another of said scales representing direction of wind with respect to a moving body, an auxiliary plate of transparent material provided with a pair of scales, one of said scales being symmetrically disposed relative to the scales on said base plate and representing ground speed in fractions of air speed, the other of said scales being calibrated in terms of air speed adapted for registry with an index carried on said base plate, said auxiliary plate being adjustable longitudinally with respect to the scales on said base plate, and a pair of relatively movable drift arms adjustably pivotally mounted on said base plate and symmetrically arranged relative to the scales thereon, each of said drift arms being provided with an air speed scale to permit the setting of said arms with respect to said scales for any given air speed, said drift arms being adapted to coact with one another and with said ground speed scale and wind speed scale to mechanically ascertain the magnitude and direction of the ground speed and wind speed vectors of said velocity triangles for any given air speed.

9. A navigation instrument for use on aircraft to determine velocity triangles in computing aircraft bearings, comprising a base plate having a plurality of symmetrically related scales arranged thereon, said scales representing respectively wind speeds as fractions of air speed, the direction of the wind, and angle of crab, an auxiliary plate of transparent material provided with a pair of scales, one of said scales being symmetrically disposed relative to the scales on said base plate and representing ground speed in fractions of air speed, the other of said scales being calibrated in terms of air speed adapted for registry with an index carried on said base plate, said auxiliary plate being adjustable longitudinally with respect to the scales on said base plate, and a pair of relatively movable drift arms adjustably pivotally mounted on said base plate and symmetrically arranged relative to the scales thereon, each of said drift arms being provided with an air speed scale to permit the setting of said arms with respect to said scales for any given air speed, said drift arms being adapted to coact with one another and with said scales to mechanically ascertain the magnitude and direction of the vectors of said velocity triangles and thereby determine the correction necessary to maintain said aircraft on a desired course.

10. A navigation instrument as set forth in claim 6, said ground speed scale being characterized by including a series of arcs of concentric circles, the centers of said arcs being positioned on the axis of symmetry of said ground speed scale, a point of reference on said axis of symmetry, the distance from the center of said arcs to said point of reference representing unity air speed, the arcs intersecting said axis of symmetry intermediate said reference point and center representing ground speed greater than unity air speed and the arcs intersected by the axis of symmetry beyond said point of reference representing ground speed less than unity air speed.

11. A navigation instrument for determining velocity triangles comprising, a base plate having a plurality of symmetrically related scales arranged thereon, one of said scales representing wind speed as fractional parts of air speed, an auxiliary plate of transparent material provided with a pair of scales, one of said scales being symmetrically disposed relative to the scales on said base plate and representing ground speed as fractions of air speed, the other of said scales being calibrated in terms of air speed adapted for registry with an index carried on said base plate, said auxiliary plate being adjustable longitudinally with respect to the scales on said base plate, and a pair of relatively movable drift arms adjustably pivotally mounted on said base plate and symmetrically arranged relative to the scales thereon, said drift arms being adapted to coact with one another and with said ground speed scale and wind speed scale to ascertain the magnitude of the ground speed and wind speed vectors of said velocity triangle, mechanically for any given air speed, said wind speed scale being characterized by including a series of concentric circles, the axis of which represents a point of reference to permit the setting of the pivoting axes of said drift arms a distance unity air speed therefrom, the radii of said circles representing wind speed in fractions of air speed.

12. A navigation instrument as set forth in claim 8, said wind direction scale consisting of a series of radial lines projected from a point of reference on the axis of symmetry of said scale and representing direction of wind speed vectors.

13. A navigation instrument as set forth in claim 9, said crab correction scale consisting of a series of parallel lines spaced a definite distance apart and numbered from the axis of symmetry of said scale, said lines representing the crab correction necessary to maintain said aircraft on a desired course.

14. A navigation instrument for the mechanical solution of the vectors of velocity triangles in computing aircraft headings comprising, a base plate having a plurality of scales symmetrically arranged thereon in superposed relationship, representing magnitudes and directions of wind speeds and ground speeds, a drift correction scale having its axis of symmetry coincident with the axis of symmetry of said first-mentioned scales, and a plurality of relatively movable indicating elements pivotally mounted on said base plate adapted for angular movement over said scales, the point of intersection of said elements representing, among others, the value or values of the corrections to be made in the headings of the aircraft in computing for drift.

15. A navigation instrument for the mechanical solution of the vectors of velocity triangles in computing ground speeds and corrected headings for an aircraft comprising, a base plate having a plurality of scales symmetrically arranged thereon in superposed relationship, representing magnitudes and directions of wind speeds and ground speeds, a drift correction scale having its axis of symmetry coincident with the axis of symmetry of said first-mentioned scales, a plurality of relatively movable indicating elements pivotally mounted on said base plate adapted for angular movement over said scales, and drift scales for setting said elements in predetermined degrees of overlapping relationship thereon in accordance with the measured drift over two courses, the point of intersection of said indicating elements on said drift correction scale representing the value or values of the corrections to be made in the headings of an aircraft in compensation for drift and on one of said first-mentioned scales the actual ground speed of said aircraft on said corrected heading.

16. A navigation instrument for the mechanical solution of the vectors of velocity triangles in computing ground speeds and corrected headings for aircraft comprising, a base plate having a plurality of scales symmetrically arranged thereon in superposed relationship, representing magnitudes and directions of wind speeds and ground speeds, a drift correction scale having its axis of symmetry coincident with the axis of symmetry of said first-mentioned scales, a plurality of angularly movable indicating elements pivotally mounted on said base plate, the pivoting axes of which are symmetrically disposed on opposite sides of the axes of symmetry of said scales, and drift scales for setting said elements in predetermined degrees of overlapping relationship thereon in accordance with the measured drift over two courses, the point of intersection of said indicating elements on said drift correction scale representing the value or values of the corrections to be made in the headings of the aircraft in compensation for drift and on one of said first-mentioned scales the actual ground speed of said aircraft on said corrected heading.

BRADLEY JONES.